US012665400B2

(12) United States Patent
Wu

(10) Patent No.: US 12,665,400 B2
(45) Date of Patent: Jun. 23, 2026

(54) WIRE PULLER

(71) Applicant: Kuei-Kun Wu, Kaohsiung (TW)

(72) Inventor: Kuei-Kun Wu, Kaohsiung (TW)

( * ) Notice: Subject to any disclaimer, the term of this patent is extended or adjusted under 35 U.S.C. 154(b) by 303 days.

(21) Appl. No.: 18/643,575

(22) Filed: Apr. 23, 2024

(65) Prior Publication Data

US 2025/0330000 A1 Oct. 23, 2025

(51) Int. Cl.
H02G 1/08 (2006.01)

(52) U.S. Cl.
CPC .................................... H02G 1/081 (2013.01)

(58) Field of Classification Search
CPC .......... H02G 1/08; H02G 1/00; H02G 1/1081; H02G 1/088
See application file for complete search history.

(56) References Cited

U.S. PATENT DOCUMENTS

| | | | | | |
|---|---|---|---|---|---|
| 1,670,543 | A | * | 5/1928 | Kellems | H02G 1/081 |
| | | | | | 403/291 |
| 4,454,999 | A | * | 6/1984 | Woodruff | B65H 49/34 |
| | | | | | 242/397.2 |

| | | | | |
|---|---|---|---|---|
| 11,967,806 | B2 * | 4/2024 | Kaleshnik | H02G 1/081 |
| 2001/0019122 | A1 * | 9/2001 | Mayr | H02G 1/081 |
| | | | | 254/134.3 FT |
| 2005/0184280 | A1 * | 8/2005 | Rivers | H02G 1/083 |
| | | | | 254/134.3 FT |
| 2014/0217339 | A1 * | 8/2014 | Passoni | B65H 75/406 |
| | | | | 254/134.3 FT |
| 2025/0330000 | A1 * | 10/2025 | Wu | H02G 1/081 |
| 2025/0350102 | A1 * | 11/2025 | Wu | H02G 1/081 |

* cited by examiner

*Primary Examiner* — Lee D Wilson
(74) *Attorney, Agent, or Firm* — MUNCY, GEISSLER, OLDS & LOWE, P.C.

(57) ABSTRACT

A wire puller handle that is without a handle and can be placed flat, and the wire puller includes a take-up wheel, a roller, a fixing frame and a spring tube. The take-up wheel is provided with a winding area inside to accommodate a pull cord, one side of the take-up wheel is connected to a concave frame with an accommodation portion, and the other side is provided with a hollow portion. An inner edge of the take-up wheel is provided for fixing one end of the pull cord. The roller is disposed in the accommodation portion and forms free rotation between the roller and the take-up wheel. One side of the fixing frame is fixed to the roller so that the take-up wheel is capable of being placed flat. One end of the spring tube is fixed to the fixing frame.

10 Claims, 13 Drawing Sheets

WIRE PULLER

FIELD OF THE INVENTION

The invention relates to a wire puller, and more particularly to a wire puller that does not require a handle and can be placed flat.

BACKGROUND OF THE INVENTION

Please refer to FIG. 1, a manual wire puller 1 is made of plastic and contains a take-up wheel 10 and a handle 11 attached to the top of the take-up wheel 10. When the manual wire puller 1 is operated on a flat surface, an operator holds the handle 11 that carries an extra weight of a pull cord 100 with one hand, and rotates the take-up wheel 10 with the other hand to drive the pull cord 100 coiled in the take-up wheel 10 to be sent out or retracted which is quite laborious and inconvenient in operation. Further, when the manual wire puller 1 is operated at a high place, there is a problem of high operational risk due to that the two hands are occupied for bearing the extra weight of the pull cord 100 and rotating the pull cord 100.

Please refer to FIG. 2, an electric wire puller 2 provides a handle 20 conveying a pull cord 210 in a take-up wheel 21. The handle 20 includes a main body 201 made of metal, a press body 202 made of plastic material pivoted at an end above the handle 20, and a fastening body 203 is pivotally connected to a middle position of the handle 20. The handle 20 is provided with a belt roller 204 inside, one side of the belt roller 204 is protruded with a shaft rod 205 for connecting with an electric drill tool 22. When the electric wire puller 2 is operated on a flat surface, an operator holds the handle 20 that carries an extra weight of a pull cord 210 with one hand, and holds the electric drill tool 22 with the other hand to replace the manual wire puller that rotating the take-up wheel 21, so that the pull cord 210 in the take-up wheel 21 is sent out or retracted. The electric wire puller 2 is required to be operated by both hands, which is laborious and inconvenient in operation. Further, when the electric wire puller 2 is operated at the high place, there is a problem of high operational risk due to that the two hands are occupied for bearing the extra weight of the pull cord 210 and holding the electric drill tool 22 to rotate.

Please refer to FIG. 3. In order to design a wire puller 3 to be placed on a ground for operation, the wire puller 3 includes a metal bracket 30, a take-up wheel 31 including a shaft 311 pivoted on one side of the metal bracket 30, a pole 32 connected to an opposite side of the metal bracket 30, and a spring tube 33 fixed at one end of the pole 32. Through the spring tube 33, a take-up wheel 31 is rotated to send out or retract a pull cord 312. Since the wire puller 3 is placed on the ground for operation, the metal bracket 30 is designed as large and heavy to prevent the metal bracket 30 from falling down when the pull cord 312 in the take-up wheel 31 is sent out. However, the wire puller 3 is hard to hold for the operator due to its heavy weight. In addition, when the wire puller 3 is operated at the high place and the spring tube 33 is not long enough to retract the pull cord 312, it requires a person to pull a wire from the high place, while another person helps hold the spring tube 33 on the ground to retract the wire. Thus, improvements are desired.

SUMMARY OF THE INVENTION

A main object of the invention is to disclose a wire puller that is provided for an operator to instantly pull or take-up a wire smoothly without carrying a handle and can be placed flat on a ground at a work site.

In order to achieve the above object, the invention provides a wire puller that is without a handle and can be placed flat. The wire puller includes a take-up wheel, provided with a winding area inside to accommodate to a pull cord, one side of the take-up wheel is connected to a convex frame with an accommodation portion, and the other side of the take-up wheel is provided with a hollow portion, and an inner edge of the take-up wheel is provided for fixing one end of the pull cord; a roller, disposed in the accommodation portion and forming free rotation between the roller and the take-up wheel; a fixing frame, one side of the fixing frame is fixed to the roller so that the take-up wheel is placed flat; and a spring tube, one end of the spring tube is fixed to the fixing frame, the take-up wheel being capable of rotating in a clockwise or a counterclockwise direction by the roller to send out or retract the other end of the pull cord from the other end of the spring tube.

Further, the take-up wheel includes a first half wheel frame and a second half wheel frame, the first half wheel frame is connected to the convex frame, an inner surface of the convex frame is provided with an annular convex body, and an outer edge of the first half wheel frame is provided with a plurality of first convex pawls arranged at intervals, and a fixing cord opening is provided below one of the plurality of first convex pawls for fixing one end of the pull cord, a center of the second half wheel frame is provided with the hollow portion for the convex frame to protrude, and an outer edge of the second half wheel frame is provided with a plurality of second convex pawls arranged at intervals, the plurality of second convex pawls are correspondingly assembled with the plurality of first convex pawls.

Further, the roller includes a base located in the accommodation portion, and a plurality of rolling wheels located on an outer edge of the base, two sides of the base are respectively provided with a limiting portion inwardly recessed, and the outer edge of the base between two limiting portions is provided with a plurality of shaft holes spaced apart, the plurality of rolling wheels are respectively provided with a male fitting wheel and a female fitting wheel, the male fitting wheel is provided with a square protruding post, the female fitting wheel is provided with a shaft rod and a square hole in the shaft rod, the square protruding post of the male fitting wheel is correspondingly engaged with the square hole of the female fitting wheel so that the shaft rod is rotated in one of the plurality of shaft holes, and the male fitting wheel and the female fitting wheel respectively positioned at the two limiting portions are capable of rotating relative to the annular convex body on the inner edge of the convex frame.

Further, the fixing frame includes a baseplate and a support frame, each of corners of the baseplate comprises a through hole, each of the through holes is embedded with a protruding pad, and the baseplate is provided with a fixing protrusion portion protruding towards the base, and one side of the fixing protrusion portion is fixed to one side of the base to form a gap between the fixing protrusion portion and the bottom of first half wheel frame, the support frame comprises a side plate frame fixed to one side of the base, and a bracket fixed on the side plate frame, the side plate frame is provided a concave surface, the bracket is provided with a cover fixed on the concave surface, a vertical plate connected to the cover, and a head portion connected to a top of the vertical plate, the head portion is arranged obliquely and provided with a passing hole.

Further, the concave surface of the side plate frame is provided with two square inlay slots, and two square inlay bodies of the cover are engaged and fixed with the two square inlay slots.

Further, one end of the spring tube obliquely penetrates into the winding area via the passing hole, and the other end of the spring tube is led out obliquely along the passing hole to provide the other end of the pull cord for passing out.

Further, the other end of the spring tube is formed with an expanded tube, and an outlet end of the expanded tube is provided with an internal thread.

Further, the wire puller includes at least one extended spring tube connected to the expanded tube at the other end of the spring tube.

Further, one end of the at least one extended spring tube is provided with an external thread to be fastened and fixed to the internal thread of the expanded tube, the other end of the at least one extended spring tube is formed with an expanded tube, and an outlet end of the expanded tube is provided with an internal thread.

Further, the head portion further comprises a first retainer and a second retainer assembled with the first retainer, the first retainer is hollow, and one end of the first retainer penetrates into the passing hole, the second retainer is sleeved on the one end of the first retainer.

Through the foregoing implementation of the invention, compared with the prior art, the invention has the following characteristics: the wire puller of the invention is convenient for the operator to instantly pull or take up the wire smoothly without carrying the handle but placing flat on the ground of the worksite, which is very convenient, labor-saving and fast to use.

DETAILED DESCRIPTION OF THE PREFERRED EMBODIMENTS

The detailed description and technical content of the invention are described below with reference to the accompanying drawings.

Figure 1:
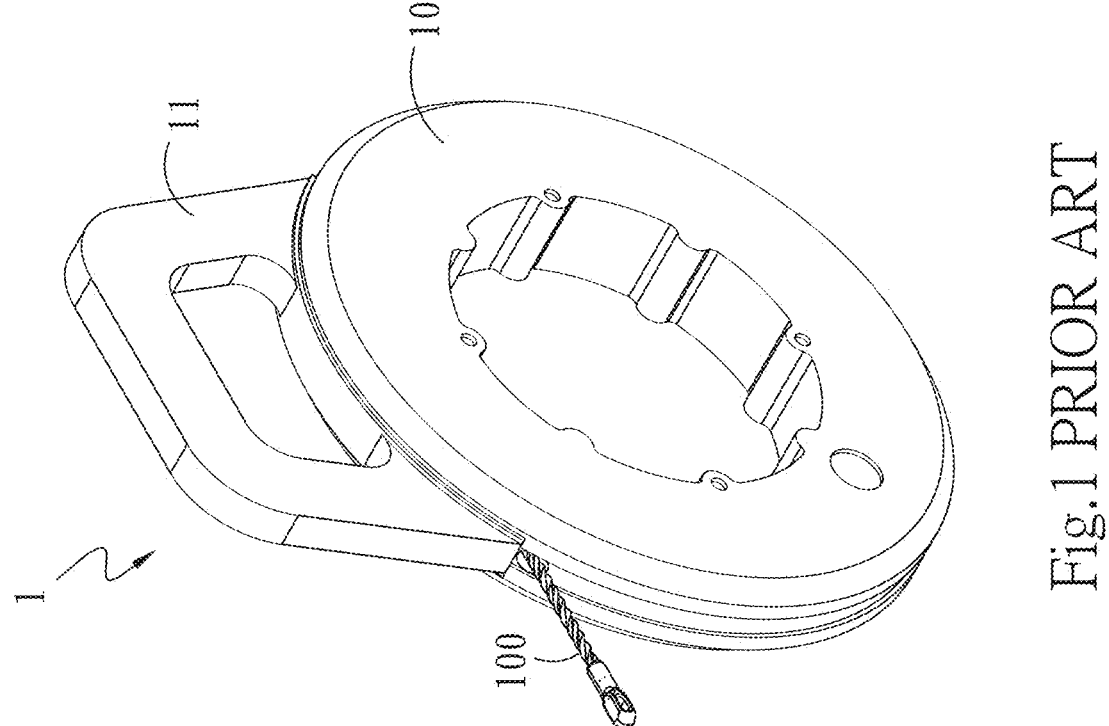
FIG. 1 is a perspective view of a conventional manual wire puller.
Figure 2:
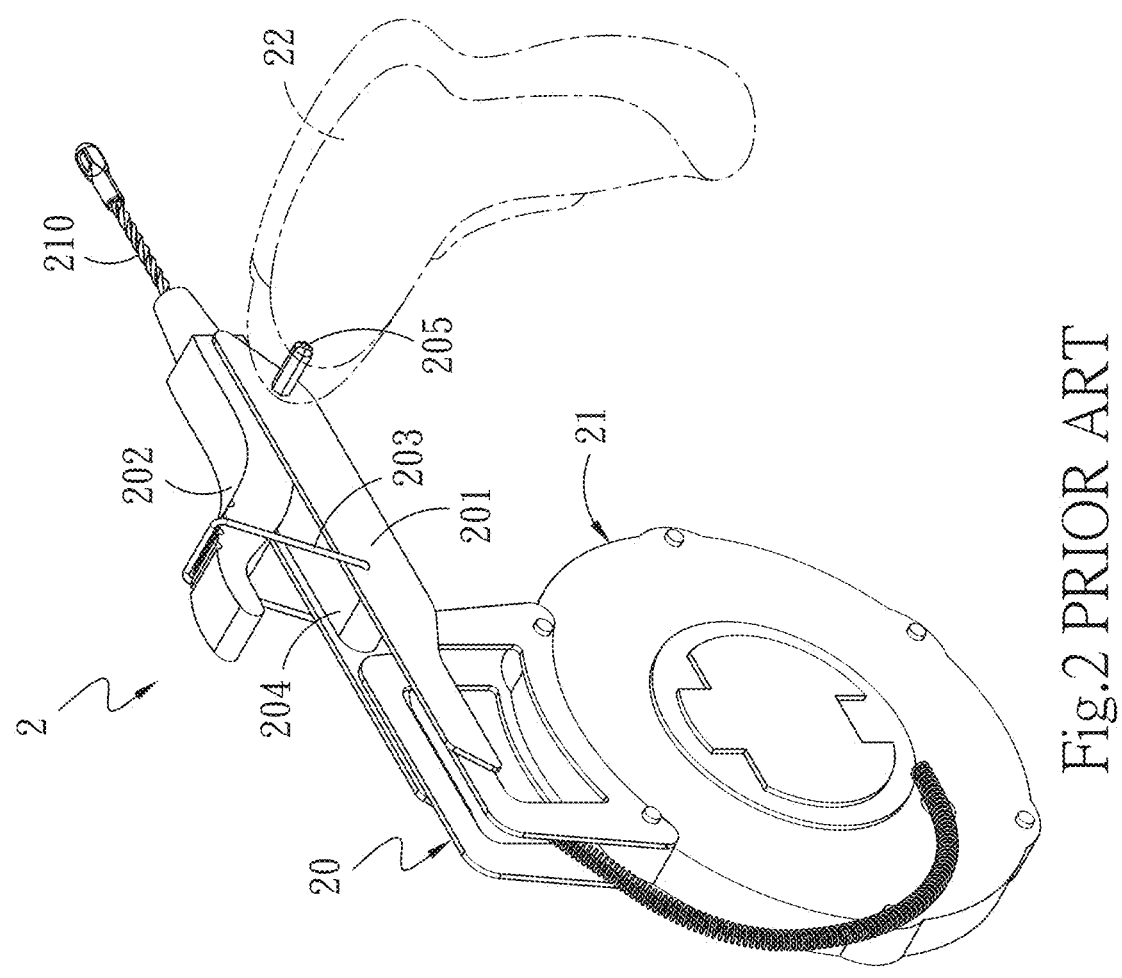
FIG. 2 is a perspective view of a conventional electric wire puller.
Figure 3:
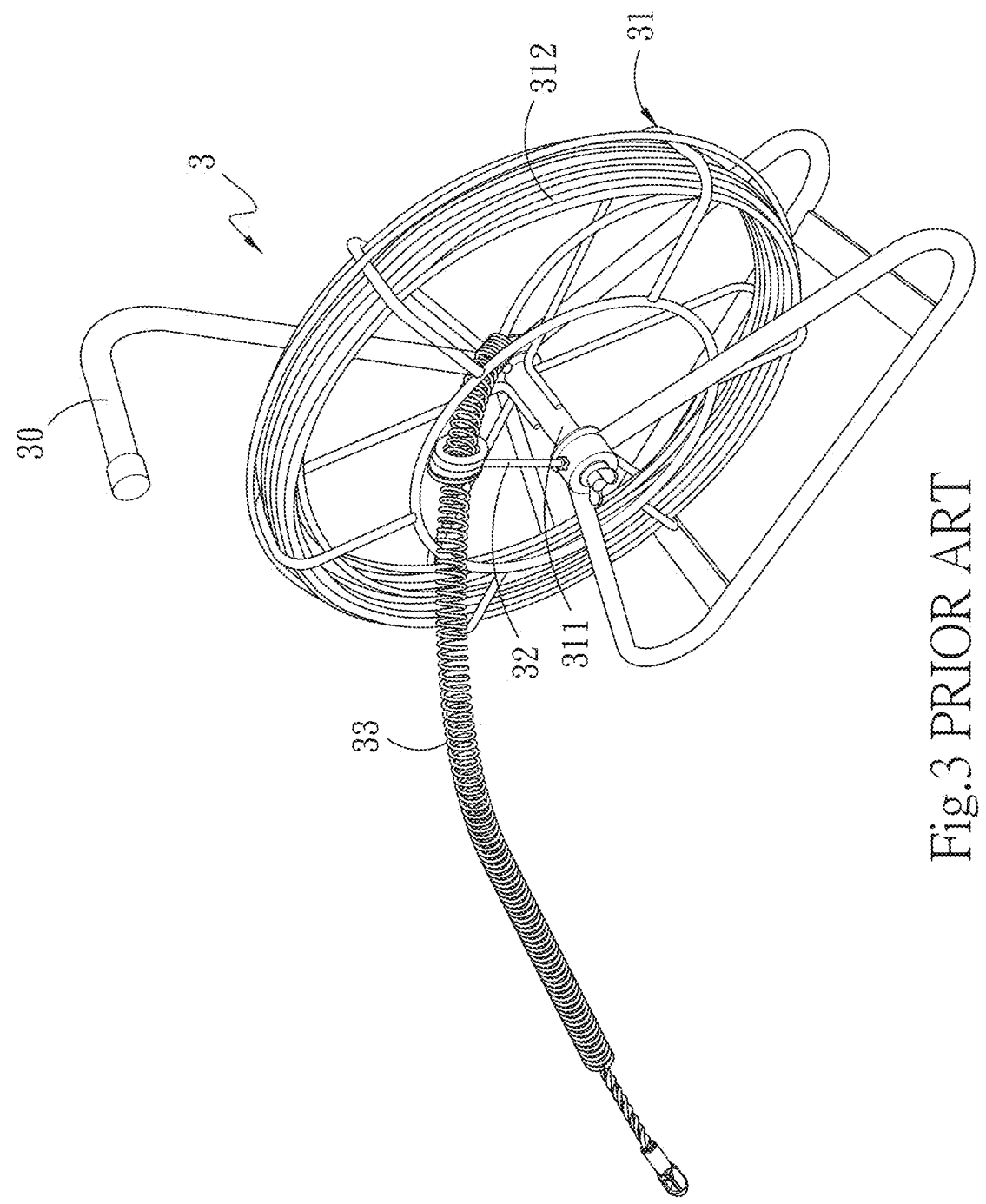
FIG. 3 is a perspective view of a conventional wire puller.
Figure 4:
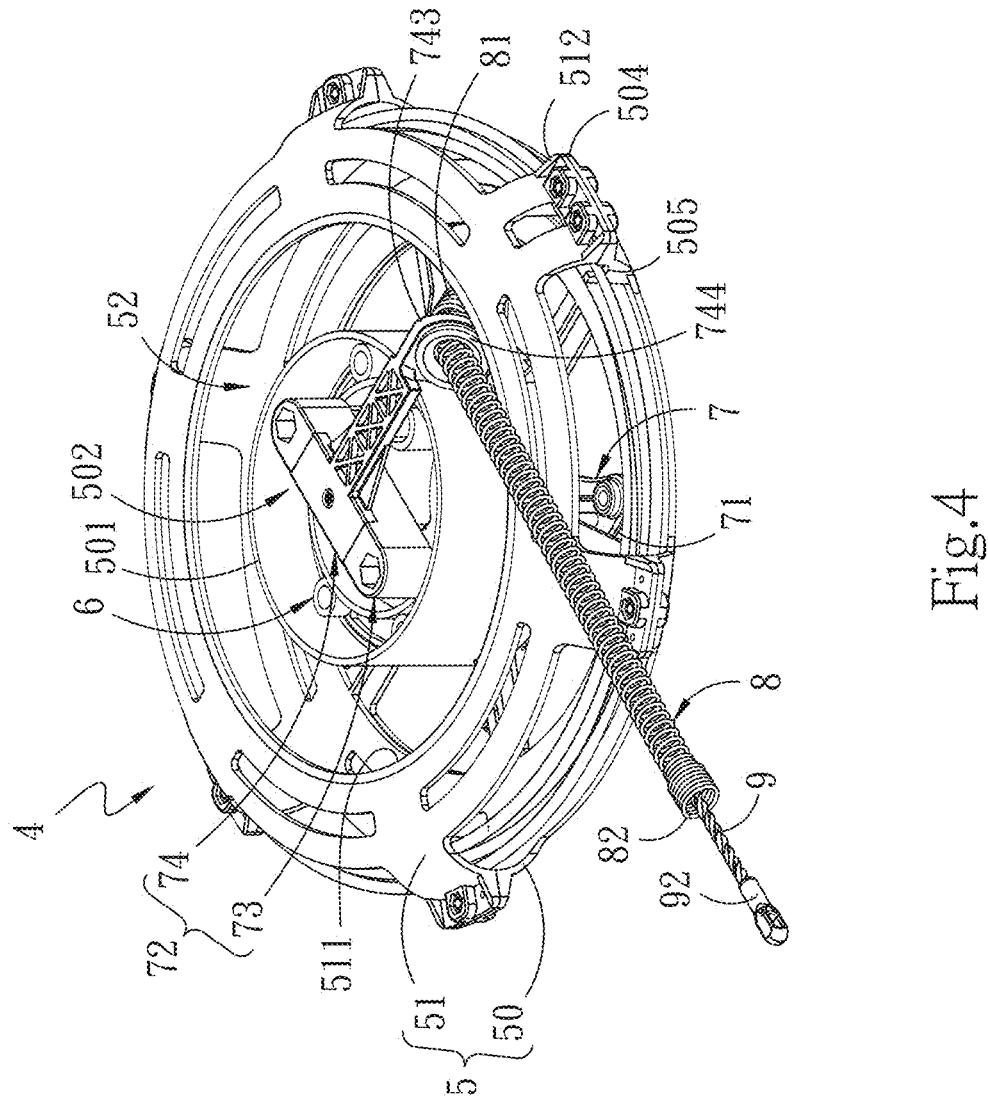
FIG. 4 is a perspective view of a combination of a wire puller and a spring tube of the invention.
Figure 5:
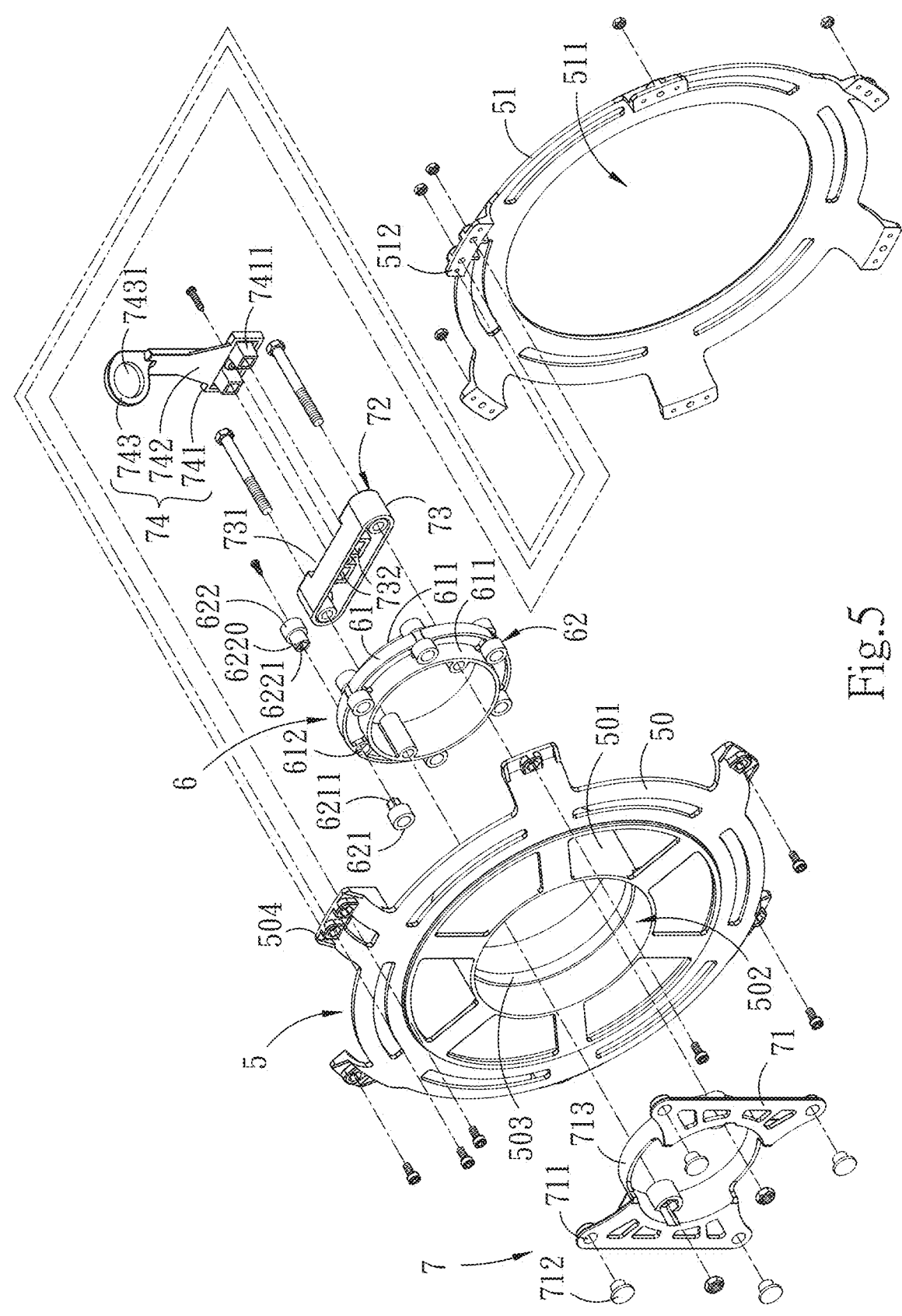
FIG. 5 is an exploded perspective view of the wire puller of the invention.
Figure 6:
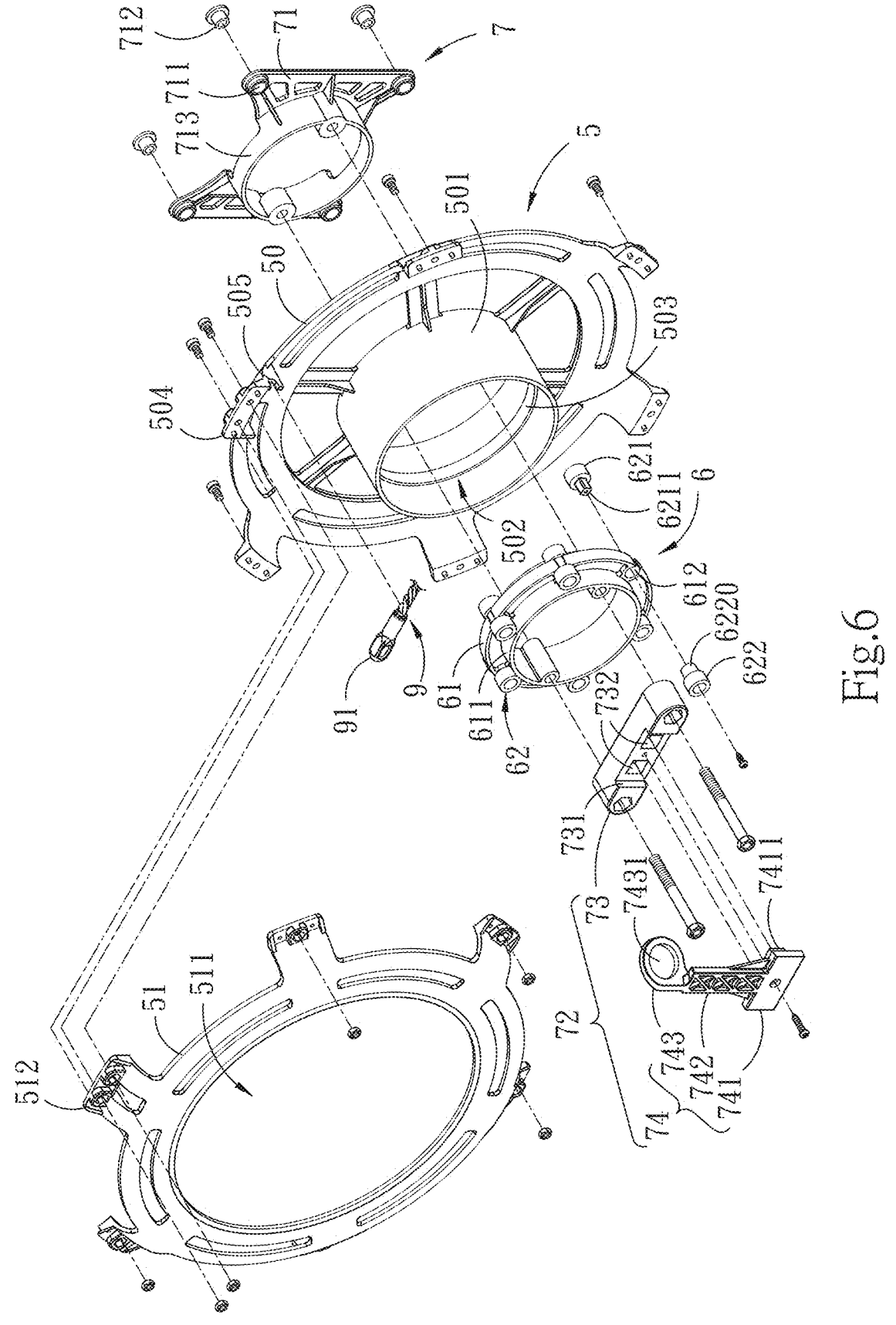
FIG. 6 is an exploded perspective view from another angle of the wire puller in FIG. 5.
Figure 7:
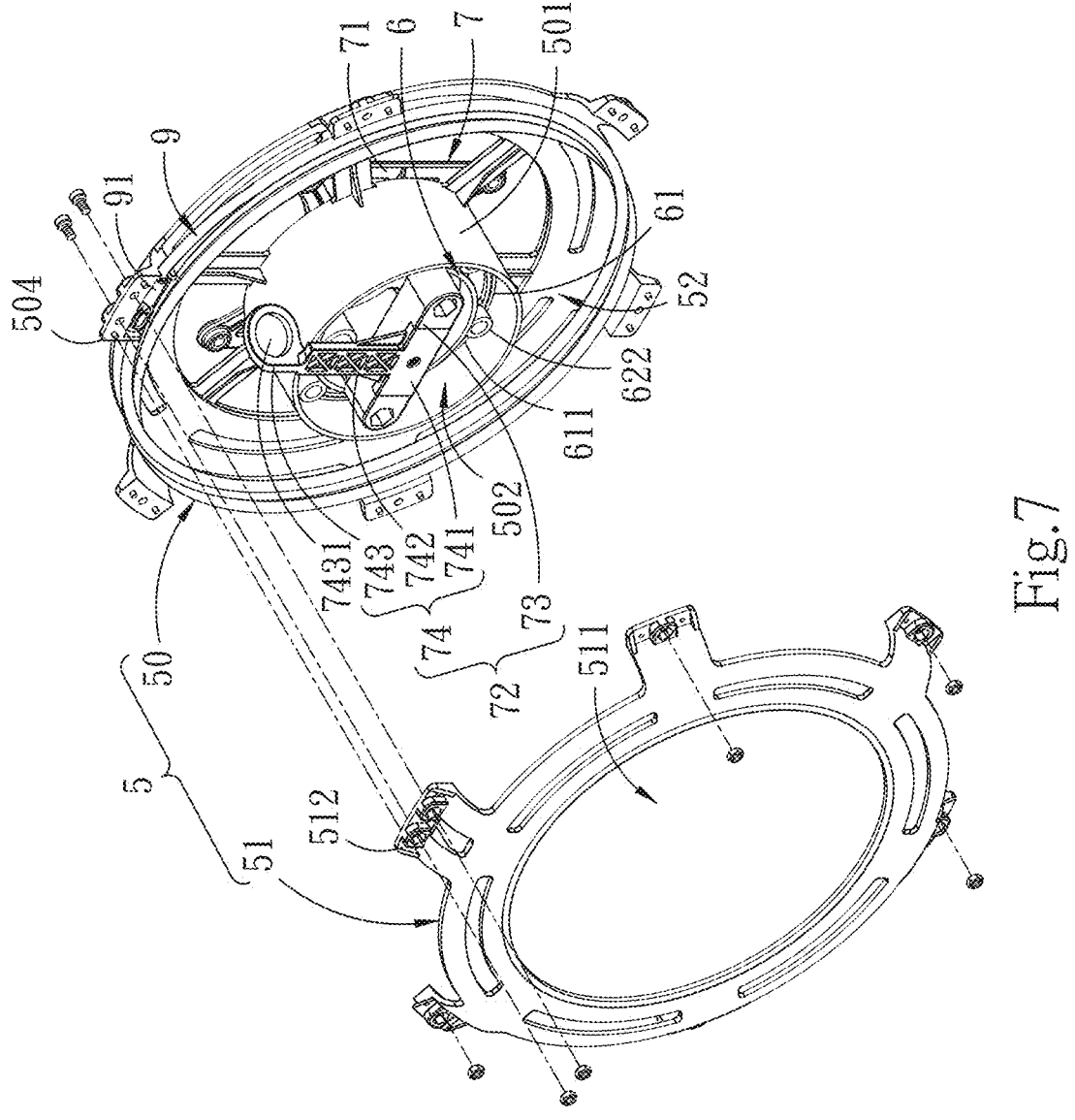
FIG. 7 is an exploded perspective view of a take-up wheel of the wire puller in FIG. 6.
Figure 8:
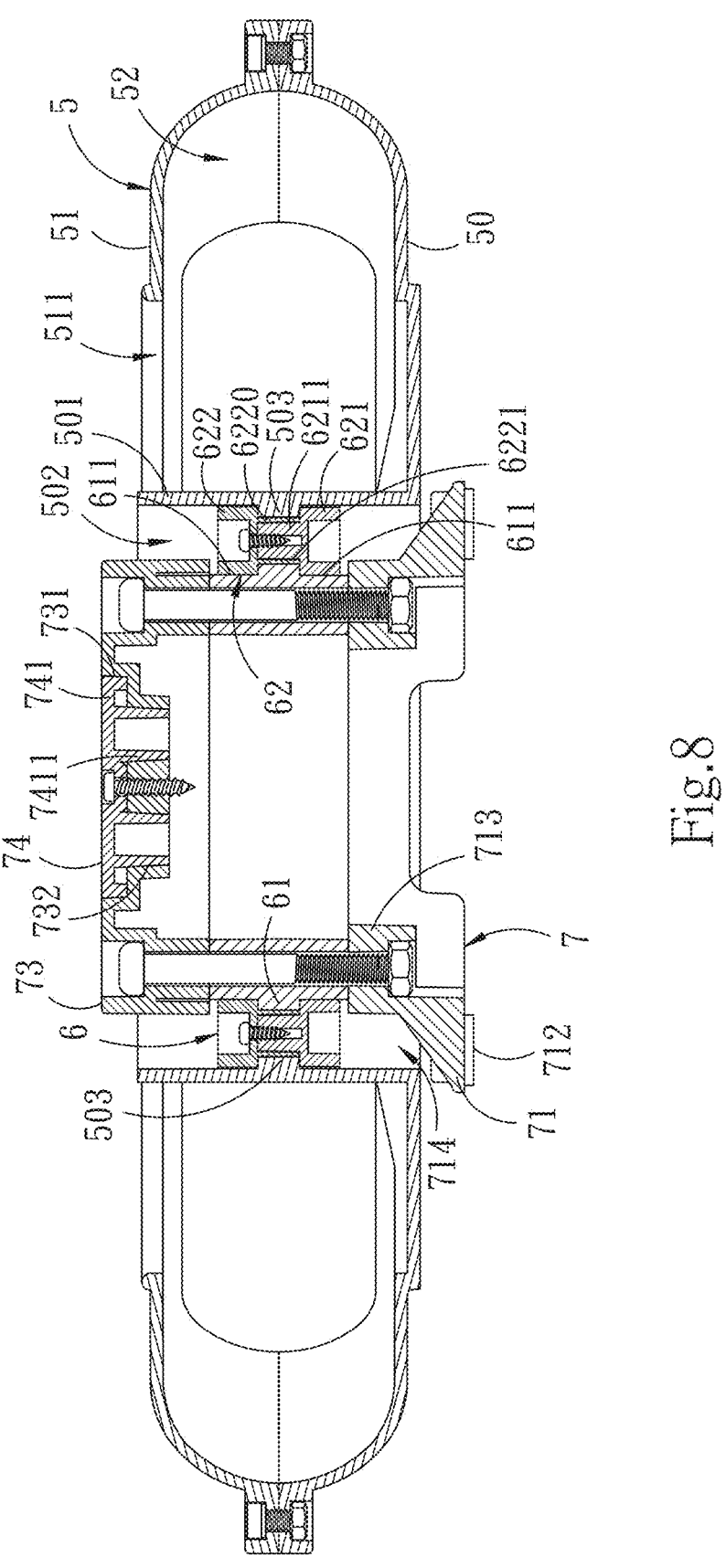
FIG. 8 is a cross-sectional view of a combination of the wire puller in FIG. 4.
Figure 9:
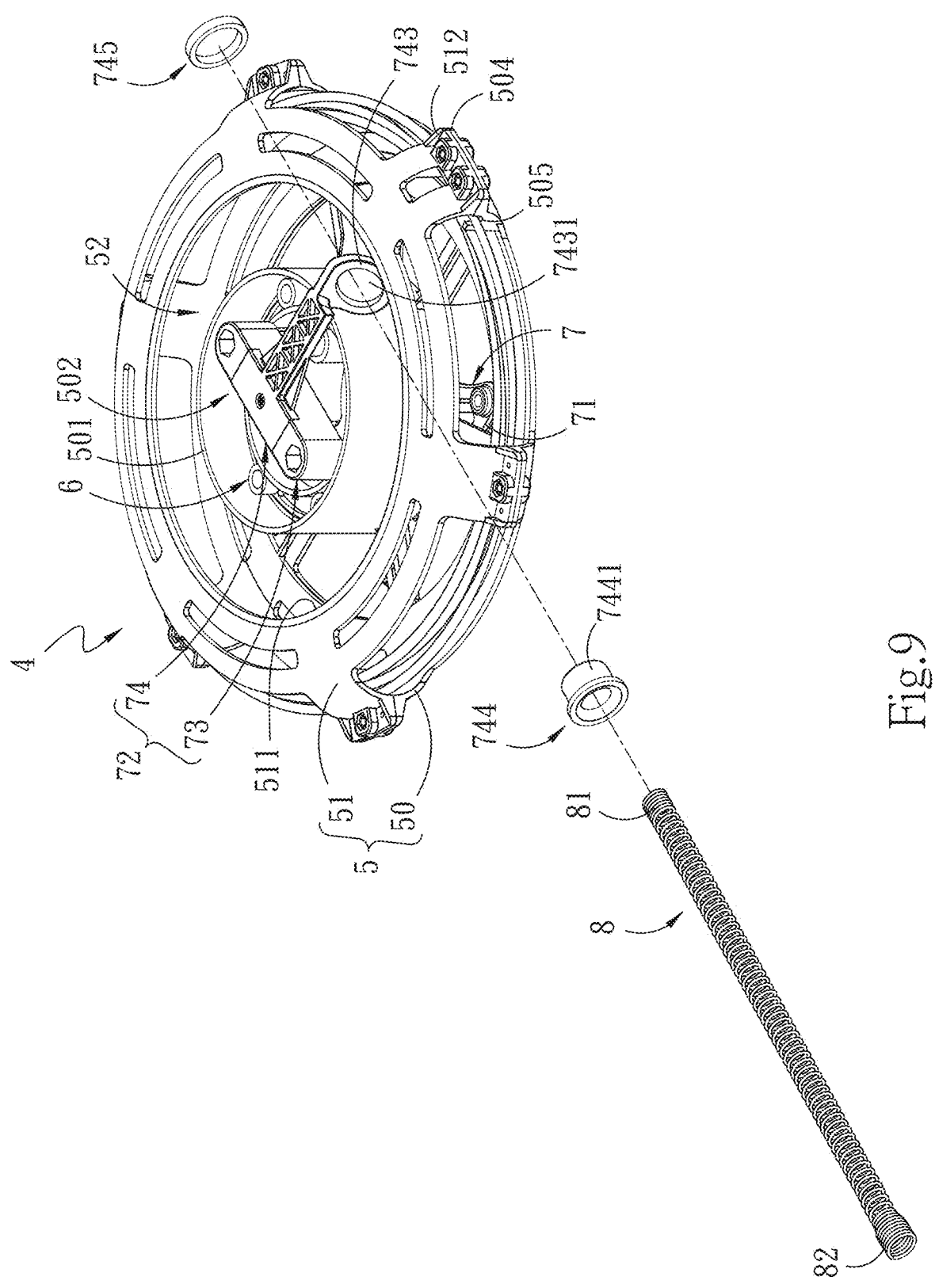
FIG. 9 is an exploded perspective view of the wire puller and the spring tube in FIG. 4.
Figure 10:
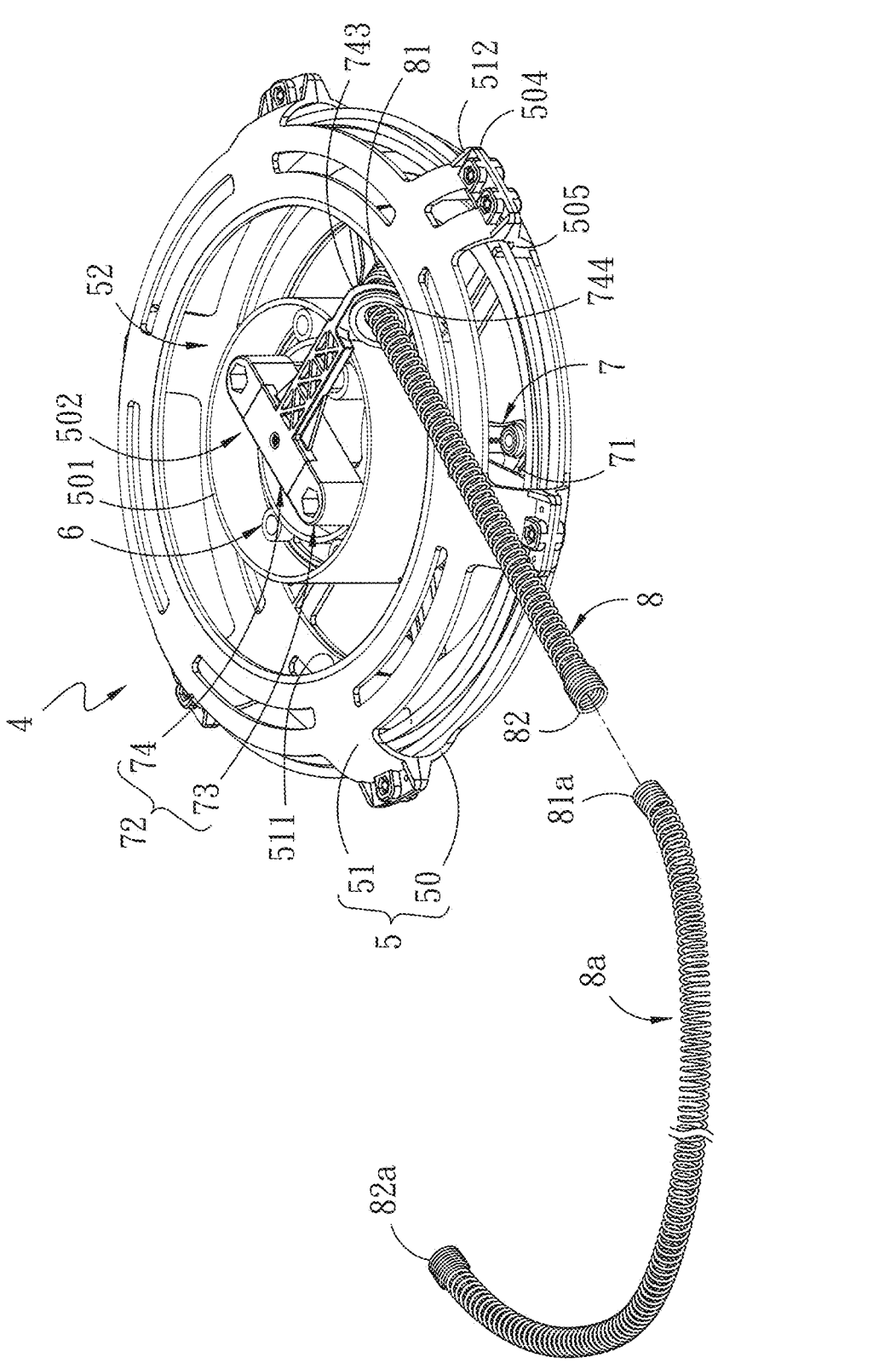
FIG. 10 is an exploded perspective view of the wire puller and an extended spring tube in FIG. 9.
Figure 11:
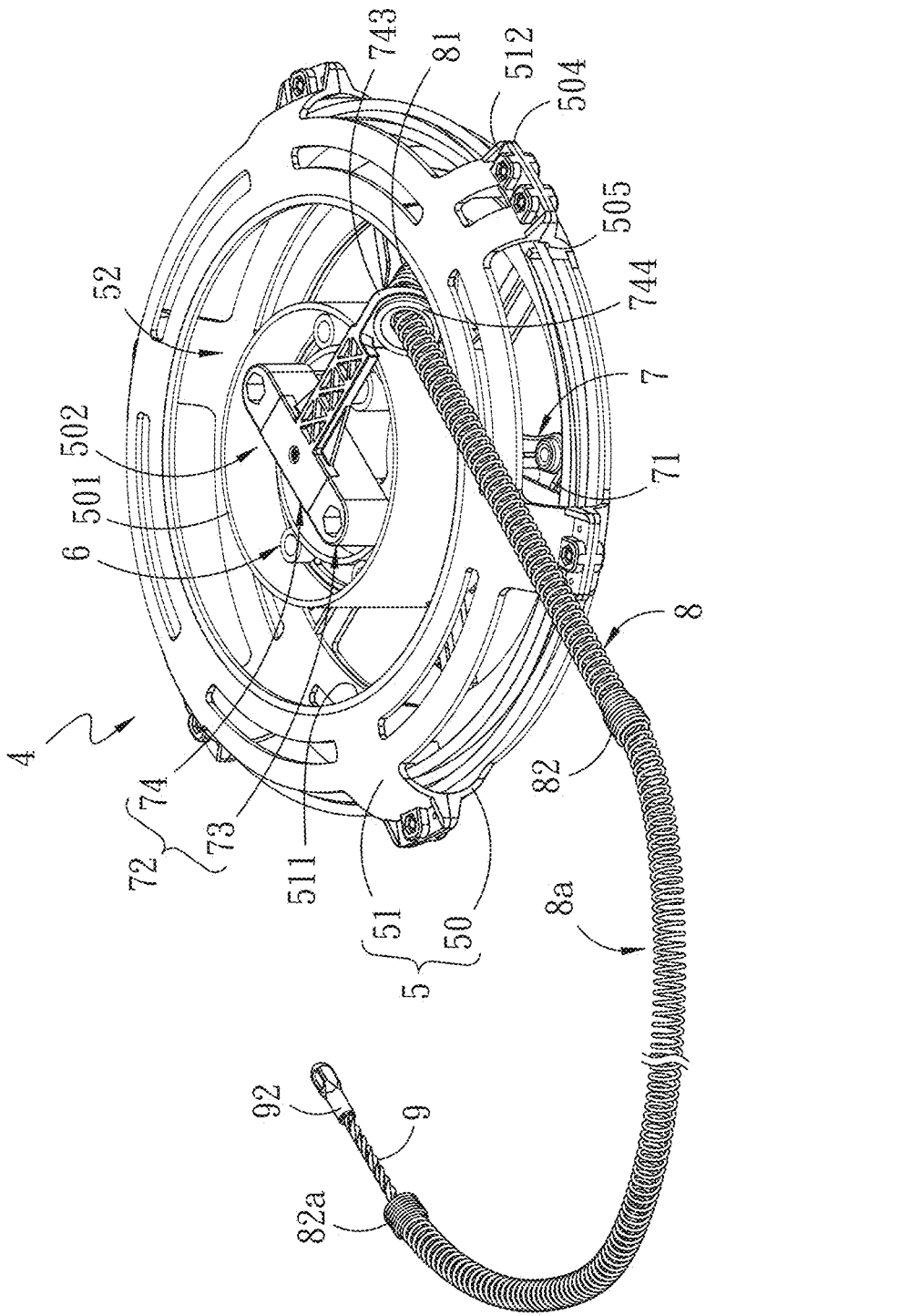
FIG. 11 is a perspective view of the wire puller and the extended spring tube in FIG. 10.
Figure 12:
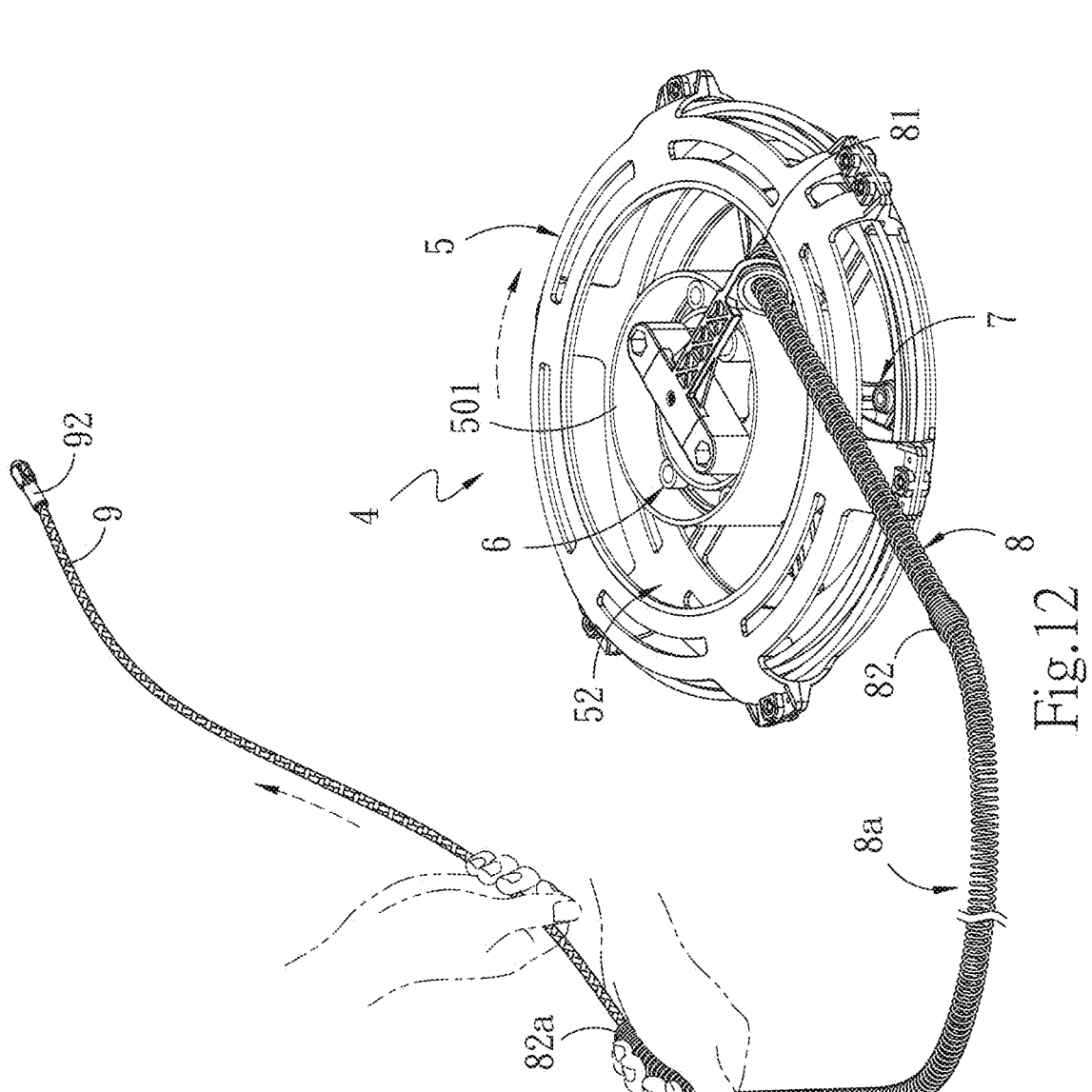
FIG. 12 is a perspective schematic diagram of taking up wire after the wire puller and the extended spring tube assembled in FIG. 11.
Figure 13:
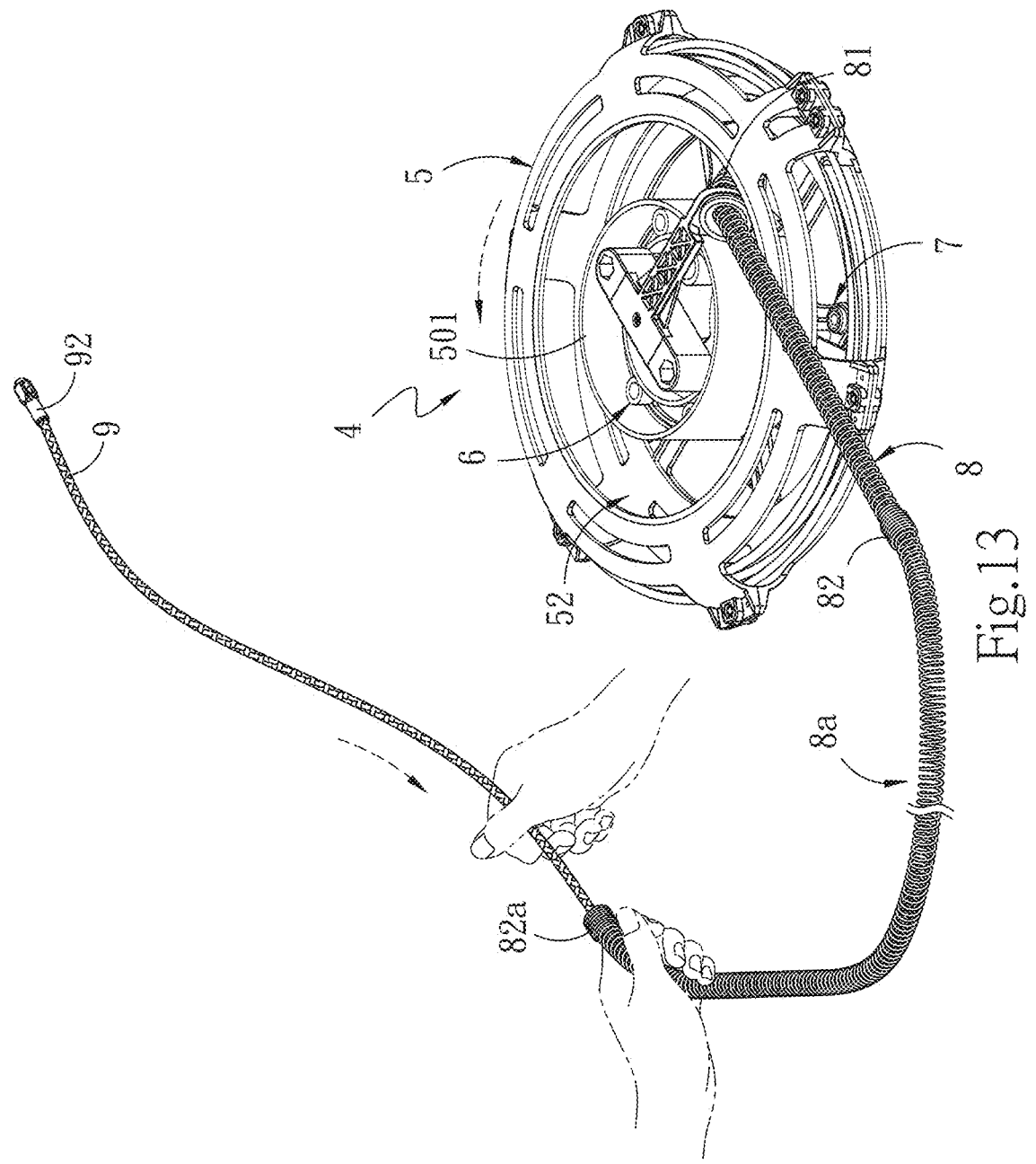
FIG. 13 is a perspective schematic diagram of retracting wire after the wire puller and the extended spring tube assembled in FIG. 11.

Please refer to FIG. 4, FIG. 5, FIG. 6, FIG. 7 and FIG. 8. The invention provides a wire puller 4, including a take-up wheel 5, a roller 6, a fixing frame 7, and a spring tube 8. The wire puller 4 is provided for an operator to pull or take up a wire immediately and smoothly without carrying a handle and can be placed flat on a ground at a work site.

The take-up wheel 5 includes a first half wheel frame 50 and a second half wheel frame 51 coupled with the first half wheel frame 50. The take-up wheel 5 is provided with a winding area 52 inside to accommodate a pull cord 9. At a center of one side of the first half wheel frame 50 is connected to a convex frame 501. The convex frame 501 is provided with an accommodation portion 502, and an inner surface of the convex frame 501 is provided with an annular convex body 503. An outer edge of the first half wheel frame 50 is provided with a plurality of first convex pawls 504 arranged at intervals, and a fixing cord opening 505 is provided below one of the plurality of first convex pawls 504 for fixing one end 91 of the pull cord 9 without slipping.

The take-up wheel 5 is provided with a hollow portion 511 at a side for the convex frame 501 to protrude. Specifically, the take-up wheel 5 is provided with the hollow portion 511 at a center of the second half wheel frame 51 for the convex frame 501 to protrude, and an outer edge of the second half wheel frame 51 is provided with a plurality of second convex pawls 512 arranged at intervals. The plurality of second convex pawls 512 are correspondingly assembled with the plurality of first convex pawls 504. The plurality of first convex pawls 504 may be coupled and assembled with the plurality of second convex pawls 512 by screwing, riveting, or fitting.

The roller 6 is located in the accommodation portion 502, causing free rotation between the roller 6 and the take-up wheel 5. The roller 6 includes a base 61 and a plurality of rolling wheels 62. The base 61 is located in the accommodation portion 502, and the plurality of rolling wheels 62 are located on an outer edge of the base 61. In an embodiment, two sides of the base 61 are respectively provided with a limiting portion 611 inwardly recessed, and the outer edge of the base 61 between two limiting portions 611 is provided with a plurality of shaft holes 612 spaced apart. Each of the plurality of rolling wheels 62 is respectively provided with a male fitting wheel 621 and a female fitting wheel 622, wherein the male fitting wheel 621 is provided with a square protruding post 6211, the female fitting wheel 622 is provided with a shaft rod 6220 and a square hole 6221 in the shaft rod 6220, the square protruding post 6211 of the male fitting wheel 621 is correspondingly engaged with the square hole 6221 of the female fitting wheel 622 so that the shaft rod 6220 can be rotated in one of the plurality of shaft holes 612, and the male fitting wheel 621 and the female fitting wheel 622 respectively positioned at the two limiting portions 611 can be capable of rotating relative to the annular convex body 503 on the inner edge of the convex frame 501.

One side of the fixing frame 7 is fixed to one side of the roller 6 so that the take-up wheel 5 is capable of being placed flat. The fixing frame 7 includes a baseplate 71 and a support frame 72. Each of corners of the baseplate 71 includes a through hole 711, each of the through holes is embedded with a protruding pad 712, and the baseplate 71 can be stably placed flat without sliding through the protruding pads 712 of the baseplate 71. The baseplate 71 is provided with a fixing protrusion portion 713 protruding towards the base 61, and one side of the fixing protrusion portion 713 is fixed to one side of the base 61 to form a gap 714 between the fixing protrusion portion 713 and the bottom of first half wheel frame 50, so that rotation of the take-up wheel 5 can be maintained stably. The fixing protrusion portion 713 may be coupled and assembled with the base 61 by screwing, riveting, or fitting.

The support frame 72 includes a side plate frame 73 and a bracket 74. One side of the side plate frame 73 is fixed to one side of the base 61, and the bracket 74 is fixed on the side plate frame 73. In an embodiment, the side plate frame 73 is approximately elongated, and one side of the side plate frame 73 facing the bracket 74 is provided with a concave surface 731. The side plate frame 73 may be coupled and assembled with the base 61 by screwing, riveting, or fitting.

The bracket 74 includes a cover 741 fixed on the concave surface 731, a vertical plate 742 connected to the cover 741, and a head portion 743 connected to a top of the vertical plate 742, wherein the cover 741 is provided with two square inlay bodies 7411, the head portion 743 is arranged obliquely and provided with a passing hole 7431. The bracket 74 can be assembled with the side plate frame 73 by embedding. In this embodiment, the concave surface 731 of the side plate frame 73 is provided with two square inlay slots 732 corresponding to the two square inlay bodies 7411 of the cover 741. Accordingly, when the cover 741 of the bracket 74 is fixed to the concave surface 731 of the side plate frame 73, the two square inlay bodies 7411 are engaged and fixed with the two square inlay slots 732, and the cover 741 is then screwed with the side plate frame 73, so as to strengthen fixing of the cover 741 and the side plate frame 73.

Please refer to FIG. 4, FIG. 5, and FIG. 6, one end 81 of the spring tube 8 obliquely penetrates into the winding area 52 via the passing hole 7431, and the other end 82 of the spring tube 8 is led out obliquely along the passing hole 7431 to provide the other end 92 of the pull cord 9 for passing out.

Please refer to FIG. 4 and FIG. 9, in an embodiment, the head portion 743 further includes a first retainer 744 and a second retainer 745 assembled with the first retainer 744. The first retainer 744 is hollow, and one end 7441 of the first retainer 744 penetrates into the passing hole 7431. The second retainer 745 is sleeved on the one end 7441 of the first retainer 744. The first retainer 744 is provided to facilitate the one end 81 of the spring tube 8 to penetrate into the winding area 52. The other end 82 of the spring tube 8 is formed with an expanded tube, and an outlet end of the expanded tube is provided with an internal thread.

According to different requirements, in one embodiment, as shown in FIG. 10 and FIG. 11, the wire puller 4 further includes at least one extended spring tube **8*a* connected to the expanded tube at the other end 82 of the spring tube 8. One end of the at least one extended spring tube 8*a* is provided with an external thread to be fastened and fixed to the internal thread of the expanded tube. The other end 82*a* of the at least one extended spring tube 8*a*** is formed with an expanded tube, and an outlet end of the expanded tube is provided with an internal thread to fasten with other extended spring tubes, so that the operator is convenient to add other extended spring tubes according to a height of the work site.

Please refer to FIG. 4, FIG. 5, FIG. 6, FIG. 7, FIG. 8, FIG. 9, FIG. 10, FIG. 11, and FIG. 12. In an embodiment, the one end 91 of the pull cord 9 is fixed to the fixing cord opening 505 and accommodated in the winding area 52, the other end 92 of the pull cord 9 passes out from the other end 82 of the spring tube 8 or the other end **82*a* of the extended spring tube 8*a*. During operation, the operator holds the other end 82 of the spring tube 8 or the other end 82*a* of the extended spring tube 8*a* with one hand, and holds the other end 92 of the pull cord 9 to pull back or push forward (as shown in FIG. 13) with the other hand, so that the take-up wheel 5 and the convex frame 501 are rotated in clockwise or counterclockwise (as shown in FIG. 13) by the roller 6 of the wire puller 4, and the other end 92 of the pull cord 9 in the winding area 52 is rotated, from the other end 82 of the spring tube 8 or the other end 82*a* of the extended spring tube 8*a*, in clockwise to be sent out or in counterclockwise (as shown in FIG. 13) to be retracted to the winding area 52. The wire puller 4** of the invention is convenient for the operator to instantly pull or take up the wire smoothly without carrying the handle but placing flat on the ground of the worksite, which is very convenient, labor-saving and fast to use.

What is claimed is:

1. A wire puller, comprising:

a take-up wheel, provided with a winding area inside to accommodate a pull cord, one side of the take-up wheel connected to a convex frame with an accommodation portion, and the other side of the take-up wheel provided with a hollow portion, and an inner edge of the take-up wheel provided for fixing one end of the pull cord;

a roller, disposed in the accommodation portion and forming free rotation between the roller and the take-up wheel;

a fixing frame, one side of the fixing frame is fixed to the roller so that the take-up wheel is placed flat; and a spring tube, one end of the spring tube is fixed to the fixing frame, the take-up wheel being capable of rotating in a clockwise or a counterclockwise direction by the roller to send out or retract the other end of the pull cord from the other end of the spring tube.

2. The wire puller as claimed in claim 1, wherein the take-up wheel comprises a first half wheel frame and a second half wheel frame, the first half wheel frame is connected to the convex frame, an inner surface of the convex frame is provided with an annular convex body, an outer edge of the first half wheel frame is provided with a plurality of first convex pawls arranged at intervals, and a fixing cord opening is provided below one of the plurality of first convex pawls for fixing one end of the pull cord, a center of the second half wheel frame is provided with the hollow portion for the convex frame to protrude, and an outer edge of the second half wheel frame is provided with a plurality of second convex pawls arranged at intervals, the plurality of second convex pawls are correspondingly assembled with the plurality of first convex pawls.

3. The wire puller as claimed in claim 2, wherein the roller comprises a base located in the accommodation portion, and a plurality of rolling wheels located on an outer edge of the base, two sides of the base are respectively provided with a limiting portion inwardly recessed, and the outer edge of the base between two limiting portions is provided with a plurality of shaft holes spaced apart, the plurality of rolling wheels are respectively provided with a male fitting wheel and a female fitting wheel, the male fitting wheel is provided with a square protruding post, the female fitting wheel is provided with a shaft rod and a square hole in the shaft rod, the square protruding post of the male fitting wheel is correspondingly engaged with the square hole of the female fitting wheel so that the shaft rod is rotated in one of the plurality of shaft holes, and the male fitting wheel and the female fitting wheel respectively positioned at the two limiting portions are capable of rotating relative to the annular convex body on the inner edge of the convex frame.

US 12,665,400 B2

7

4. The wire puller as claimed in claim 3, wherein the fixing frame comprises a baseplate and a support frame, each of corners of the baseplate comprises a through hole, each of the through holes is embedded with a protruding pad, and the baseplate is provided with a fixing protrusion portion protruding towards the base, and one side of the fixing protrusion portion is fixed to one side of the base to form a gap between the fixing protrusion portion and the bottom of first half wheel frame, the support frame comprises a side plate frame fixed to one side of the base, and a bracket fixed on the side plate frame, the side plate frame is provided a concave surface, the bracket is provided with a cover fixed on the concave surface, a vertical plate connected to the cover, and a head portion connected to a top of the vertical plate, the head portion is arranged obliquely and provided with a passing hole.

5. The wire puller as claimed in claim 4, wherein the concave surface of the side plate frame is provided with two square inlay slots, and two square inlay bodies of the cover are engaged and fixed with the two square inlay slots.

6. The wire puller as claimed in claim 4, wherein one end of the spring tube obliquely penetrates into the winding area via the passing hole, and the other end of the spring tube is led out obliquely along the passing hole to provide the other end of the pull cord for passing out.

7. The wire puller as claimed in claim 6, wherein the other end of the spring tube is formed with an expanded tube, and an outlet end of the expanded tube is provided with an internal thread.

8. The wire puller as claimed in claim 7, further comprising at least one extended spring tube connected to the expanded tube at the other end of the spring tube.

9. The wire puller as claimed in claim 8, wherein one end of the at least one extended spring tube is provided with an external thread to be fastened and fixed to the internal thread of the expanded tube, the other end of the at least one extended spring tube is formed with an expanded tube, and an outlet end of the expanded tube is provided with an internal thread.

10. The wire puller as claimed in claim 4, wherein the head portion further comprises a first retainer and a second retainer assembled with the first retainer, the first retainer is hollow, and one end of the first retainer penetrates into the passing hole, the second retainer is sleeved on the one end of the first retainer.

* * * * *